US007100359B2

(12) United States Patent
Shibata et al.

(10) Patent No.: US 7,100,359 B2
(45) Date of Patent: Sep. 5, 2006

(54) GAS TURBINE INSTALLATION

(75) Inventors: Takanori Shibata, Hitachinaka (JP);
Shigeo Hatamiya, Hitachi (JP);
Nobuhiro Seiki, Hitachi (JP); Tomomi Koganezawa, Hitachi (JP); Katsuhiko Sagae, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/363,483

(22) Filed: Feb. 28, 2006

(65) Prior Publication Data

US 2006/0144034 A1    Jul. 6, 2006

Related U.S. Application Data

(62) Division of application No. 10/896,926, filed on Jul. 23, 2004, which is a division of application No. 10/674,402, filed on Oct. 1, 2003, now Pat. No. 6,772,596, which is a division of application No. 10/080,556, filed on Feb. 25, 2002, now Pat. No. 6,718,750.

(30) Foreign Application Priority Data

Jul. 26, 2001 (JP) ............................. 2001-225316

(51) Int. Cl.
*F02C 7/10* (2006.01)
(52) U.S. Cl. .................................. 60/39.511
(58) Field of Classification Search ............ 60/39.511, 60/39.512, 39.53, 728; 165/4
See application file for complete search history.

(56) References Cited

U.S. PATENT DOCUMENTS 3,054,257 A    9/1962    Schelp 4,753,068 A    6/1988    El-Masri
4,870,816 A    10/1989   Nakhamkin

FOREIGN PATENT DOCUMENTS

| JP | 60-185094   | 9/1985  |
|----|-------------|---------|
| JP | 1-19053     | 4/1989  |
| JP | 1-31012     | 6/1989  |
| JP | 05-332164   | 12/1993 |
| JP | 06-026361   | 2/1994  |
| JP | 9-236024    | 9/1997  |
| JP | 9-264158    | 10/1997 |
| JP | 11/270349   | 10/1999 |
| JP | 11-324710   | 11/1999 |
| JP | 2001-027157 | 1/2001  |
| JP | 2001-132473 | 5/2001  |

*Primary Examiner*—Louis J. Casaregola
(74) *Attorney, Agent, or Firm*—Mattingly, Stanger, Malur & Brundidge, P.C.

(57) ABSTRACT

A gas turbine installation which includes a compressor which compresses supplied air and discharges the same, a combustor which combusts the compressed air obtained from the compressor and fuel and produces combustion gas, a turbine which is driven by combustion gas provided from the combustor, a regenerative heat exchanger which heats all or a part of the compressed air being supplied from the compressor to the combustor by making use of the heat of the exhaust gas exhausted from the turbine and a plurality of water spraying devices which are provided at positions from an intake air chamber of the compressor to the outlet of low temperature side gas flow passage in the regenerative heat exchanger and is characterized in that the regenerative heat exchanger is constituted by connecting in series a plurality of heat exchangers having different heat transfer surface configurations. Thereby, a gas turbine installation is provided which suppresses generation of erosion and scales due to water droplets and shows a high efficiency and a high output.

5 Claims, 4 Drawing Sheets

GAS TURBINE INSTALLATION

This is a divisional application of U.S. Ser. No. 10/896,926, filed Jul. 23, 2004; which is a divisional application of U.S. Ser. No. 10/674,402, filed Oct. 1, 2003, now U.S. Pat. No. 6,772,596 now allowed; which is a divisional application of U.S. Ser. No. 10/080,556, filed Feb. 25, 2002, now U.S. Pat. No. 6,718,750.

BACKGROUND OF THE INVENTION

1. Field of the Invention

The present invention relates to a gas turbine installation which utilizes highly humidified air as the combustion use air thereof.

2. Conventional Art

For example, JP-B-1-31012 (1989) and JP-A-9-264158 (1997) disclose conventional art gas turbine installation making use of humidified air, in particular, a gas turbine cycle in which compressed air compressed by a compressor and heated liquid phase water being used as heat recovery medium are caused to be contacted at a humidification tower to obtain humidified air (mixture of air/steam) and cooled liquid phase water, with the obtained humidified air heat recovery of turbine exhaust gas is performed as well as by using the obtained cooled liquid phase water as heat recovery medium, heat recovery due to the turbine exhaust gas and intermediate cooling of the compressor are performed, and further, liquid phase water in an amount corresponding to that transferred as steam into the compressed air in the exchange tower (the humidification tower) is supplied to the exchange tower and into the liquid phase served for the heat recovery which is used as cooling medium downstream the intermediate cooler of the compressor which is performed by the cooled liquid phase water obtained at the exchange tower.

Further, JP-B-1-19053 (1989) discloses a gas turbine system in which without using the exchange tower (humidification tower) as disclosed in the above JP-B-1-31012 (1989) and JP-A-9-264158 (1997), with humidified air (mixture of mixed layers of compressed air/water/steam) which is obtained by injecting liquid phase water into outlet air of a compressor, heat recovery of turbine exhaust gas or the heat recovery of the turbine exhaust gas and intermediate cooling of the compressor are performed, and compressed air used for forming the humidified air is cooled in advance by a part of the humidified air.

Still further, JP-A-11-324710 (1999) discloses a humidification method of compressed air supplied from a compressor to a combustor in a gas turbine system in which an atomizer for atomizing water or steam to compressed air flowing through a regenerative heat exchanger is provided in the regenerative heat exchanger.

However, all of the above conventional arts do not sufficiently take into account a problem that scales (precipitates of impurities dissolved in water) caused when water droplets evaporate from a heat transfer surface of a heat exchanger stick on the heat transfer surface, therefore, the conventional art is possibly suffered to problems such as of lowering of heat transfer efficiency and increasing of flow passage pressure loss in a long time span.

When scales stick inside the regenerative heat exchanger, heat resistance of the heat transfer wall surfaces increases which causes to reduce overall heat transfer coefficient and heat transfer efficiency. Further, when scales stick on a narrow flow passage, it is possible that the flow passage is clogged. Still further, when working medium at both a low temperature side and a high temperature side is gas, the heat transfer efficiency thereof is poor in comparison with a case when the work medium is liquid, therefore, the size of a heat exchanger is generally like to be increased. For this reason, a plate-fin type regenerative heat exchanger which is also called as a compact heat exchanger and is constituted by very small flow passages is frequently used as a heat exchanger between gases. When gas containing water droplets are heated by making use of such plate-fin type regenerative heat exchanger, it is necessary to broaden space between heat transfer surfaces so as to avoid clogging, therefore, it was possible to cause problems of reducing heat transfer efficiency of the heat exchanger and increasing the size of the system. Still further, when such plate-fin type regenerative heat exchanger is used, it was required to thicken the plate thickness for countermeasuring erosion caused by liquid droplet collision which also increases the size of the installation.

SUMMARY OF THE INVENTION

An object of the present invention is to provide a compact gas turbine installation which suppresses generation of erosion and scales due to water droplets and shows a high efficiency and a high output.

A gas turbine installation of the present invention which achieves the above object includes a compressor which compresses air, a combustor which combusts the compressed air from the compressor and fuel, a turbine which is driven by combustion gas produced in the combustor, a regenerative heat exchanger which performs heat exchange between exhaust gas exhausted from the turbine and at least a part of the compressed air supplied to the combustor and a water spraying device which supplies water into intake air to the compressor or into the compressed air compressed by the compressor and is characterized in that the regenerative heat exchanger is constituted by connecting in series a plurality of heat exchangers having different heat transfer surface configurations.

DETAILED DESCRIPTION OF THE PREFERRED EMBODIMENTS

Figure 1:
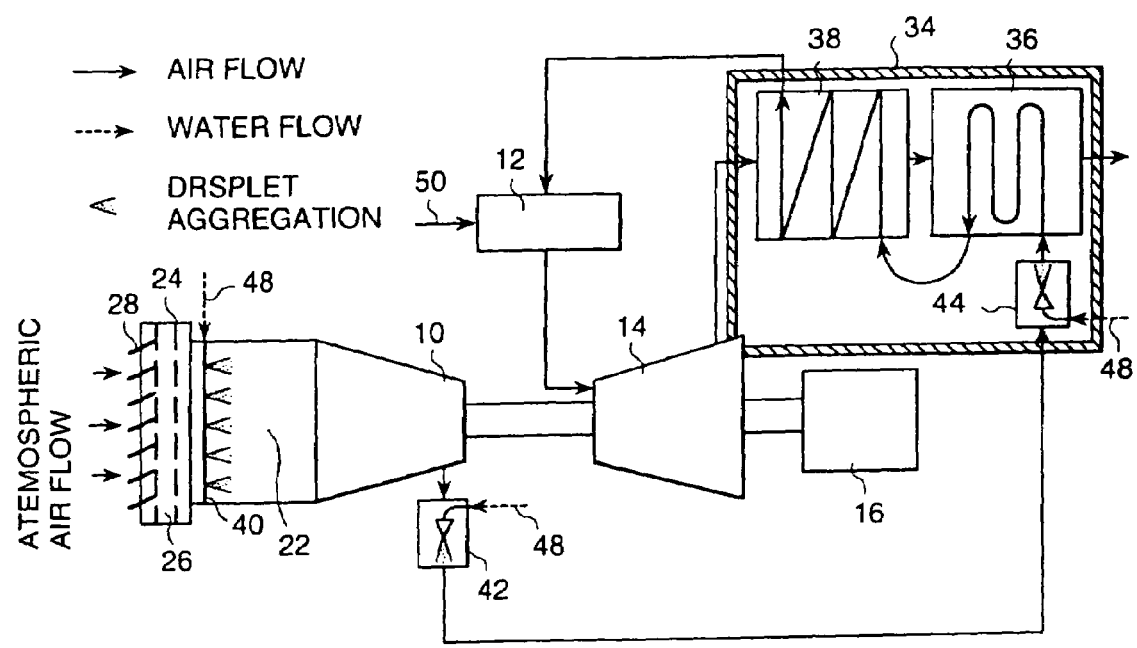
FIG. 1 is a system diagram of a gas turbine installation showing one embodiment of the present invention.

FIG. 1 shows a system diagram of a gas turbine cycle representing one embodiment of the present invention. A gas turbine electric power generation installation of the present embodiment is provided with a compressor 10 which compresses air and discharges the same, a combustor 12 which combusts the compressed air obtained by compression in the compressor 10 and fuel and produces combustion gas, a turbine 14 which is driven by the combustion gas produced in the combustor 12, and a two phase type regenerative heat exchanger 36 and a single phase type regenerative heat exchanger 38 which heat all of or a part of the compressed air supplied from the compressor 10 to the combustor 12 by making use of the heat of the exhaust gas exhausted from the turbine 14. An electric power generator 16 which obtains motive power from an output shaft of the gas turbine 14 and converts the same into electric power is connected to a not shown electric power transmission system. Further, an illustration such as pumps is omitted.

At the upstream side of the compressor 10, an intake air chamber 22 which takes in intake air to be supplied to the compressor 10 is connected. For example, at the intake air side (upstream side) of the intake air chamber 22 an intake air filter chamber 26 in which filters 24 are disposed is arranged, and at the upstream side in the intake air filter chamber 26 louvers 28 are arranged. Further, in the intake air chamber 22 a water spraying device 40 is disposed, and depending on the operating conditions proper moisture content is added into the intake air. Further, in the passage where the compressed air discharged from the compressor 10 reaches the combustor 12 water spraying devices 42 and 44 are disposed which spray water into the compressed air.

An atomizer nozzle, for example, disclosed in JP-A-9-236024 (1997) can be used for the water spraying device 40. In the present embodiment the water spraying device 40 is disposed at the inlet of the compressor 10, for example, in the intake air chamber 22 spaced apart from a first stationary blade. Further, in FIG. 1, the water spraying device 40 is illustrated being disposed downstream the intake air filters 24 in the intake air filter chamber 26. Apart or all of moisture content in liquid phase sprayed at the water spraying device 40 is evaporated before entering into the compressor 10, takes out heat contained in the intake air in a from of water evaporation latent heat and reduces the temperature of the intake air. All of or a major part of the remaining liquid droplets is evaporated within the compressor 10 in accordance with the air temperature rise by the compressor 10. In the manner as has been explained, through water spraying into the intake air in the water spraying device 40, the temperature of air to be compressed can be reduced, thereby, a required compressor motive force can be reduced and the output of the turbine 14 can be increased.

At the outlet portion of the compressor 10 or at the nearby position thereof, another water spraying device 42 is disposed. Further, at the inlet portion of the regenerative heat exchanger 36 or the nearby position thereof, still another water spraying device 44 is also disposed. These water spraying devices 42 and 44 spray water to the compressed air (high temperature wetted air) led from the compressor 10 to increase work medium for the turbine 14 and to reduce air temperature.

In the two phase type regenerative heat exchanger 36, exhaust heat recovery in the exhaust gas from the gas turbine 14 is performed by making use of the air containing steam and water droplets added in the upstream water spraying devices 42 and 44. Further, in the single phase type regenerative heat exchanger 38 by making use of the air containing moisture content in gas phase which is formed by fully evaporating the water droplets added at the water spraying device 42 and 44 by the two phase type regenerative heat exchanger 36, the exhaust heat recovery is performed. Through the spraying water in the water spraying devices 42 and 44, the temperature of the air led to the two phase type regenerative heat exchanger 36 and the single phase type regenerative heat exchanger 38 is reduced, thereby, the quantity of recovery heat at the two phase type regenerative heat exchanger 36 and the single phase type regenerative heat exchanger 38 can be increased and heat efficiency of the installation can be improved.

The water spraying devices 40, 42 and 44 include passages of supplying water being sprayed into the air introduced. A make-up water supply device 48 which supplies water to the water spraying device 40, 42 and 44 can be configured to introduce water, for example, from an external system of the concerned gas turbine installation and the associated machines and apparatuses thereof. Alternatively, it can be configured to recover the water from an internal system of the concerned gas turbine installation and the associated machines and apparatuses thereof. Further, alternatively, it can be configured in such a manner that any of the water spraying devices 40, 42 and 44 makes use of the make-up water from the external system and the other primarily makes use of the recovery water. As methods of spraying water into air, such as a method of spraying water droplets against the compressed air stream and a method of feeding water to a structural body facing the passage of the compressed air flow and contacting the same to the compressed air stream.

The water added compressed air by the water spraying devices 42 and 44 is supplied to the two phase type regenerative heat exchanger 38 and the single phase type regenerative heat exchanger 38 which heat the compressed air by making use of the exhaust gas from the gas turbine 14 as the heat source. In the present embodiment, the two phase type regenerative heat exchanger 36 and the single phase type regenerative heat exchanger 38 are formed into an integrated package with a partition wall, however, both can be packaged independently. Further, for the convenience sake, the two phase type regenerative heat exchanger 36 and the single phase type regenerative heat exchanger 38 are respectively illustrated as independent regenerative heat exchangers, however, in an actual machine both can be integrated as a single component.

The two phase type regenerative heat exchanger 36 and the single phase type regenerative heat exchanger 38 are different with regard to the moisture content phase states contained in the compressed air as well as with regard to configuration of the heat transfer surfaces corresponding thereto. For example, a fin and tube structure is used for the heat transfer surface in the two phase type regenerative heat exchanger 36 and a plate-fin structure is used for the heat transfer surface in the single phase type regenerative heat exchanger 38. With the former structure, the cross section of the flow passage where the compressed air passes is large in comparison with that of the later, and since the configuration of the cross section is round, a possible clogging of the flow passage because of scale generation due to water droplet evaporation is low and the cleaning of inside tubes is easy.

Further, for example, when the plate-fin structure is used for the heat transfer surface configurations in both two phase type regenerative heat exchanger 36 and the single phase type regenerative heat exchanger 38, it is sufficient if the space between fins in the two phase type regenerative heat exchanger 36 is selected broader than that in the single phase type regenerative heat exchanger 38. With this measure, even if scales stick on the heat transfer surface, the clogging of the flow passage can be avoided and a performance deterioration can be prevented.

As has been explained above, the heated compressed air by the two phase type regenerative heat exchanger 36 and the single phase type regenerative heat exchanger 38 is supplied to the combustor 12 and is combusted therein together with fuel 50 added to form high temperature combustion gas which drives the turbine 14, and after the heat of the exhaust gas is recovered in the two phase type regenerative heat exchanger 36 and the single phase type regenerative heat exchanger 38 by the compressed air from the compressor 10, the exhaust gas is exhausted into the atmospheric air.

As in the present embodiment, through the use of the heat transfer configuration having a broader flow passage at the compressed air side, for example, the fin and tube structure, for the two phase type regenerative heat exchanger 36 which performs the exhaust heat recovery by means of the air containing water droplets, great many amount of moisture content can be evaporated without caring about the flow passage clogging due to scale sticking.

Further, with respect to the single phase type regenerative heat exchanger 38 which performs exhaust heat recovery by the air containing primarily only steam, by making use of the heat transfer surface configuration having a narrower flow passage width at the compressed air side, for example, the plate-fin structure, the heat transfer surface area per unit length at the low temperature side (compressed air side) and at the high temperature side (heat exhaust side) can be increased, thereby, heat transfer efficiency can be improved, in other words, a compact regenerative heat exchanger with high efficiency can be constituted.

JP-A-11-324710 (1999) discloses a method of enhancing plant efficiency by spraying moisture content at the compressed air side of a regenerative heat exchanger, however, nowhere discloses a heat transfer surface configuration when recovering the exhaust heat by the air containing liquid droplets. When work medium at both lower temperature side and higher temperature side is primarily gas, a regenerative heat exchanger having a plate-fin structure is usually used. In order to improve heat transfer efficiency and compactness of the regenerative heat exchanger, when a heat exchanger having low height and narrow space fins, for example, both height and space are about a few mm is used, scales caused by evaporation of water droplets in the compressed air stick on the heat transfer surface and which possibly causes clogging. If the height and space of the fins are increased to an extent free from such scale sticking problem, the problem of clogging can be surely resolved, however, a reduction of heat transfer efficiency and a size increase of the regenerative heat exchanger can not be avoided. As in the present embodiment, when the width and height of the flow passage in the regenerative heat exchanger where the work medium at the low temperature side flows are varied depending on existence and absence of liquid droplets in the work medium, a compact and highly efficient regenerative heat exchanger as well as gas turbine installation can be constituted.

Now, locating position and amount of water spray of the water spraying devices 40, 42 and 44 as shown in FIG. 1 will be explained.

As in the present embodiment, in the case of the gas turbine installation in which the exhaust heat recovery is performed by the water added compressed air after leaving the compressor 10, when the amount of moisture content added to the compressed air is increased, the output of the turbine side increases correspondingly and the plant efficiency and output likely increase. Therefore, it is important to evaporate moisture content as much as possible with any means, while avoiding problems such as scale generation and erosion.

In order to evaporate an added water droplet in air, it is necessary that the humidity around the water droplet does not reach saturation and the contacting time of the water droplet with air, in other words, residence time of the water droplet is sufficiently long. The amount of water which can be evaporated into air is determined from water saturation amount which is a function of air temperature, and the higher the air temperature is, the more water can evaporate into the air. In order to increase steam amount which performs exhaust heat recovery inside the two phase type regenerative heat exchanger 36 and the single phase type regenerative heat exchanger 38, it will be conceived to add more water at the water spraying device 40 which locates at the most upstream side in view of the water droplet residence time, however, since the saturation steam amount in the air before heating such as in the compressor 10 and in the two phase type regenerative heat exchanger 36 is less, great part of the added water advects through the inside of the compressor 10 and through the inside of the pipings upto the two phase type regenerative heat exchanger 36 under a condition of liquid droplets. In this instance, since the great part of the moisture content advects in a state of liquid droplets, the liquid droplets collide such as to the compressor blades and the piping members to cause problems of corrosion and erosion, if the diameter of the liquid droplets is not properly controlled, therefore, the above measure is not advantageous.

Contrary, if much water is added near at the outlet of the two phase type regenerative heat exchanger 36 where the air is sufficiently heated to a high temperature, since the amount of saturation steam is large because of high air temperature, the amount of evaporatable steam is much, however, the residence time of the water droplets within the two phase type regenerative heat exchanger 36 is shortened, the liquid droplets are likely exhausted from the two phase type regenerative heat exchanger 36 before completing evaporation thereof, and the rate where the steam is utilized for heat recovery becomes low.

As in the present embodiment, at first an amount of water of which evaporation can be substantially completed within the compressor 10 is added by the water spraying device 40, subsequently another amount of water of which evaporation can be substantially completed before entering into the two phase type regenerative heat exchanger 36 is added to the air heated to a high temperature and pressurized to a high pressure after the compressor 10, finally, still another amount of water of which evaporation can be substantially completed within the two phase type regenerative heat exchanger 36 is added, thereby, further much water is sprayed at the upstream side and further much steam can be utilized in the single phase type regenerative heat exchanger 38 for heat exchange. Moreover, since the amount of water droplets advected in a form of liquid droplets is suppressed as much as possible, thereby, a possible erosion of structural bodies and scale generation are limited.

Further, as a modification, a water spraying device can be disposed at an intermediate position of the flow passage of the compressed air in the two phase type regenerative heat exchanger 36 and further moisture content can be added therewith to the advected compressed air. In this modification, since the compressed air is already heated to a high temperature by the exhaust heat recovery, the saturation steam amount is large, thereby, a further much moisture content can be evaporated further rapidly, which increases the flow rate of the turbine work medium and enhances output and heat efficiency thereof. Further, the amount of liquid droplets advected at the upstream portion in the two phase type regenerative heat exchanger 36 can be decreased, while keeping the amount of steam which contributes for heat exchange within the two phase type regenerative heat exchanger 36, the problems of such as erosion and scale generation in the two phase type regenerative heat exchanger 36 can be lowered which reduces maintenance cost for the gas turbine system.

Figure 2:
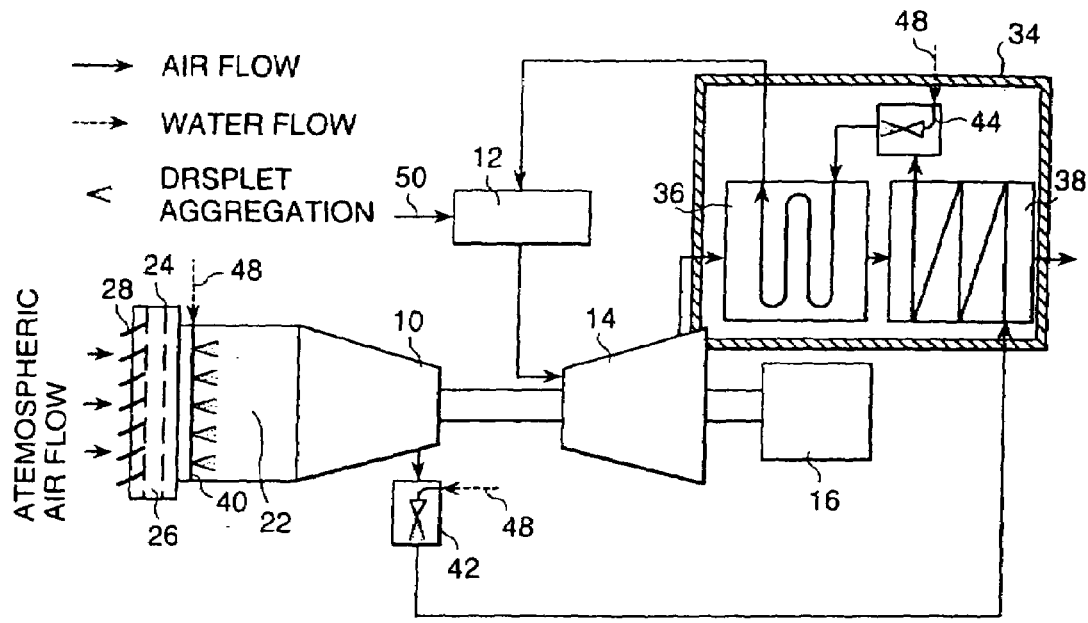
FIG. 2 is a system diagram of a gas turbine installation showing another embodiment of the present invention.

FIG. 2 shows a system diagram of a gas turbine installation representing another embodiment of the present invention. In FIG. 1 embodiment, the two phase type regenerative heat exchanger 36 is arranged at the lower temperature side of the exhaust gas of the gas turbine 14 and the single phase type regenerative heat exchanger 38 is arranged at the high temperature side (at the upstream side of the turbine exhaust gas) of the exhaust gas. However, in the present embodiment as shown in FIG. 2, the two phase type regenerative heat exchanger 36 is arranged at the high temperature side (at the upstream side of turbine exhaust gas) of the exhaust gas, and the single phase type regenerative heat exchanger 38 is arranged at the low temperature side (at the downstream side of the exhaust gas). Further, the water spraying device 44 is arranged so as to spray water into the air supplied to the two phase type regenerative heat exchanger 36 via the single phase type regenerative heat exchanger 38.

In the present embodiment, since water is added to the compressed air which is heated to a further high temperature after being passed through the single phase type regenerative heat exchanger 38, the evaporation speed of the liquid droplets can be increased, thereby, the size of the single phase type regenerative heat exchanger 38 can be reduced.

Further, when a fin and tube structure is used for the two phase type regenerative heat exchanger 36 and a plate-fin structure is used for the single phase type regenerative heat exchanger 38, since the plate thickness of the heat transfer surface of the fin and tube structure is generally thick and structurally strong in comparison with that of the plate-fin structure, if the two phase type regenerative heat exchanger 36 is located at the high temperature side of the exhaust gas of the gas turbine 14, the exhaust gas temperature of the gas turbine 14 can be raised which is generally limited by the material strength of the adjacent regenerative heat exchanger. Accordingly, under the condition that the exhaust heat temperature of a gas turbine installation is limited by the material strength limitation of the regenerative heat exchanger, through arranging the two phase type regenerative heat exchanger 36 at the high temperature side of the exhaust gas and the single phase type regenerative heat exchanger 38 at the low temperature side, the exhaust heat temperature of the gas turbine 14 can be increased and a total plant efficiency can be enhanced, when constituting a regenerative cycle in such a manner.

Further, at the downstream side of the water spraying device 42 and into a flow passage which supplies the compressed air by the compressor 10 to the single phase type regenerative heat exchanger 38, if a structural body for accelerating evaporation of the added liquid droplets at the water spraying device 42 is disposed, the compressed air can be supplied to the single phase type regenerative heat exchanger 38 under a condition that the liquid droplets sprayed into the air are surely evaporated.

Figure 3:
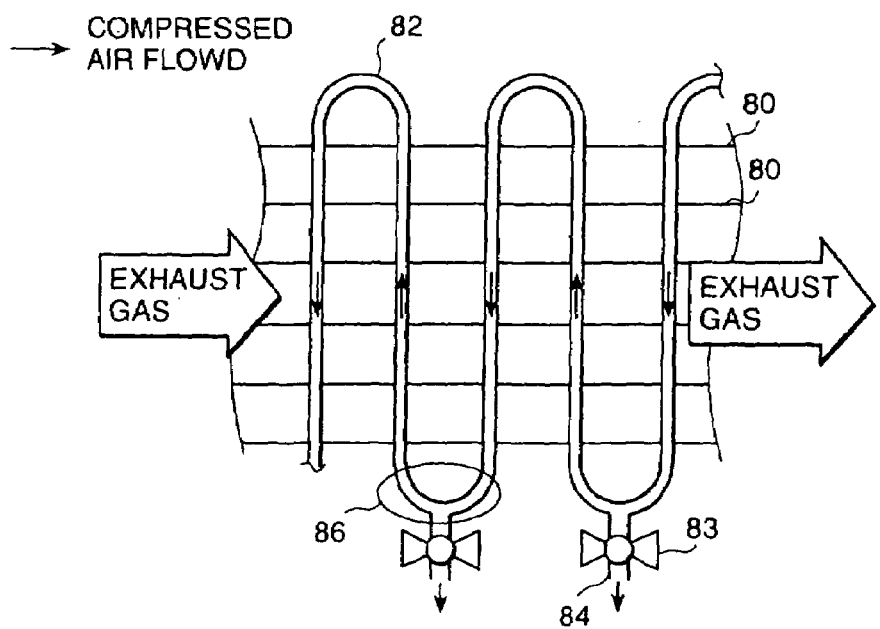
FIG. 3 is a structural diagram of a regenerative heat exchanger representing one embodiment of the present invention.

Now, an embodiment of the two phase type regenerative heat exchanger 36 as shown in FIGS. 1 and 2 will be explained with reference to FIG. 3. FIG. 3 shows a part of a fin and tube type heat exchanger. Heat of the high temperature air of the exhaust gas from the gas turbine 14 is taken out while passing through between plates 80. The low temperature side air of the compressed air supplied from the compressor 10 absorbs heat of the exhaust gas while flowing through a tube 82 which is coupled with the plates 80 in such a manner to pass therethrough. The moisture content in a liquid phase being collected due to gravity in U shaped tube portions 86 at the bottom of the tube 82 is discharged outside the tube 82 when valves 83 are opened because of pressure difference between the compressed air and external air.

In the U shaped tube portions 86 at the bottom of the tube 82 where the moisture content in liquid phase is likely collected, the moisture content evaporates more than in the other portions, therefore, a possibility of scale generation therein is high. Further, it is also possible that an already existing scale serves as a core which grows a further larger scale to cause tube clogging. Contrary, as in FIG. 3 embodiment, when a drain 84 serving as a drain tube is provided at a position where water is likely collected and the valve 83 is occasionally opened depending on collecting condition of the moisture content in liquid phase, the liquid collection causing scale generation is removed, and reduction of heat exchange efficiency, pressure loss increase and a possible clogging of the tubes can be suppressed.

Figure 4:
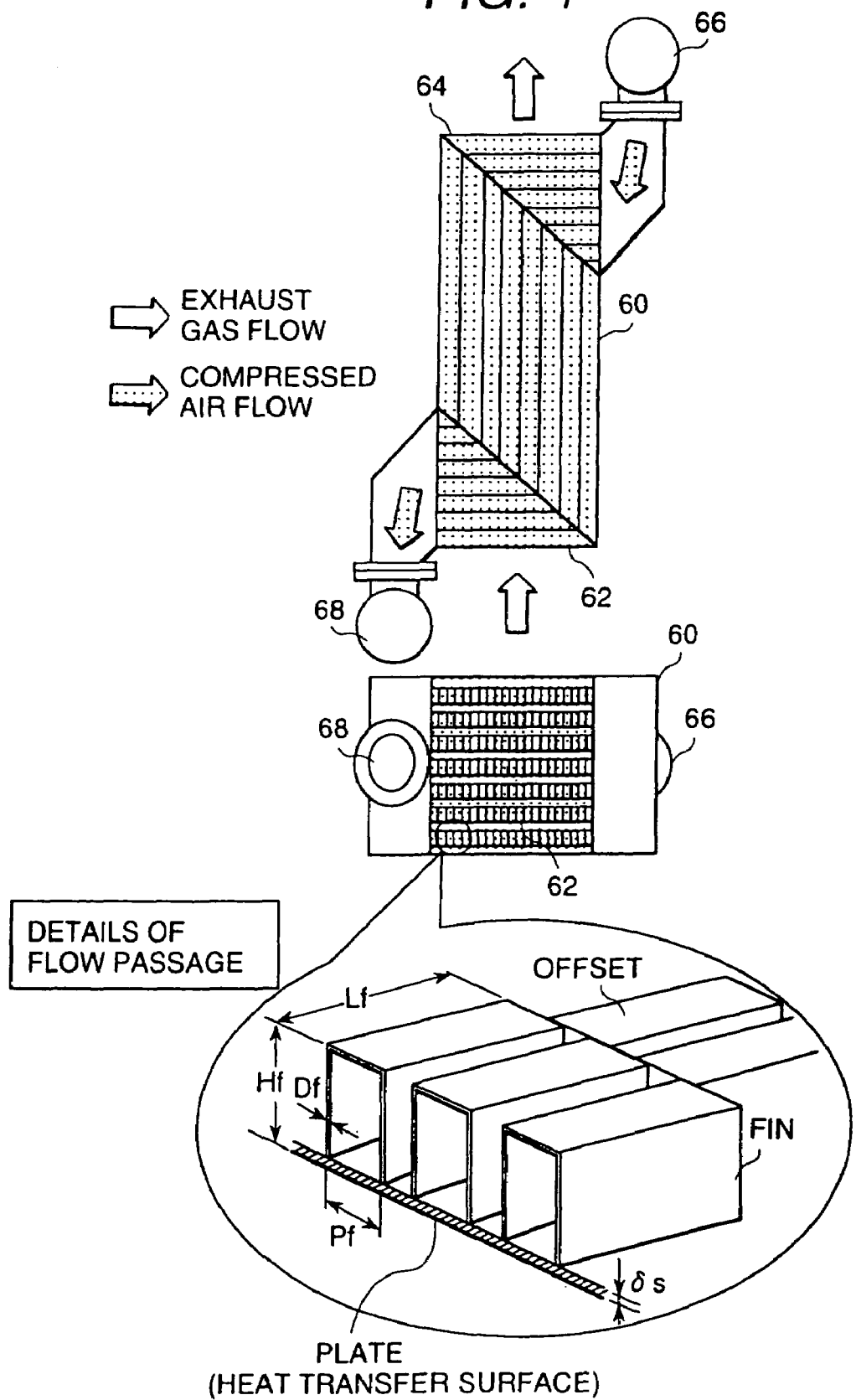
FIG. 4 is a diagram showing a regenerative heat exchanger having a unit module structure representing another embodiment of the present invention.
Figure 5:
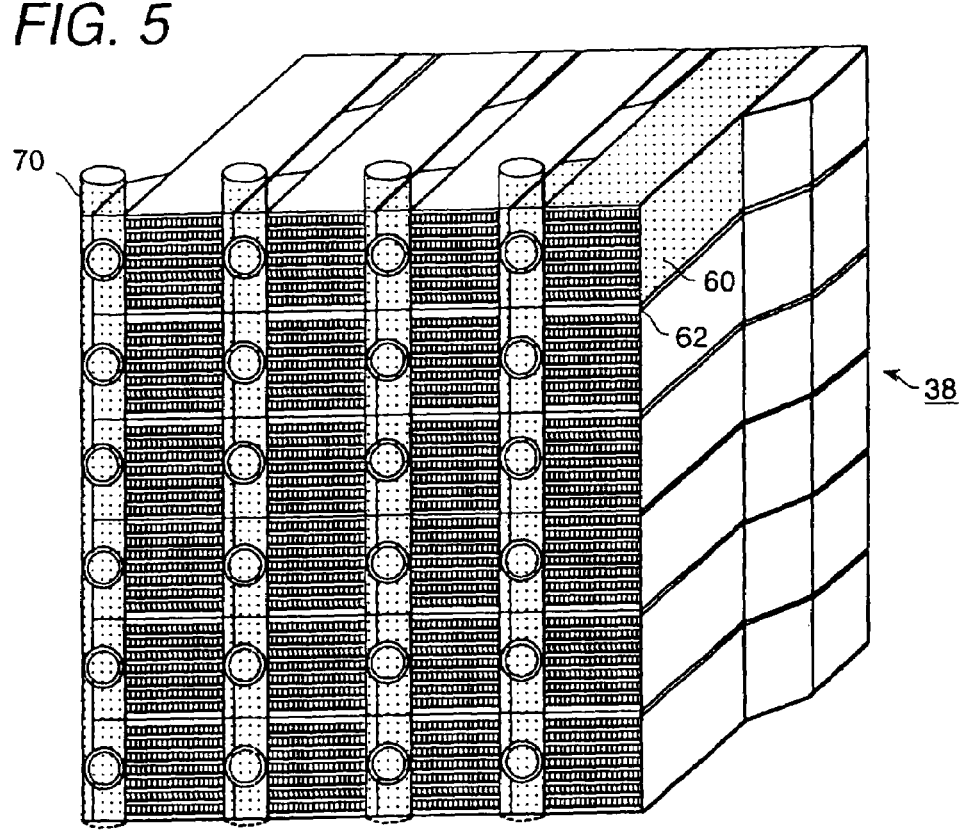
FIG. 5 is a diagram showing a regenerative heat exchanger constituted by combining a plurality of unit modules as shown in FIG. 4.

FIGS. 4 and 5 show an embodiment of the single phase type regenerative heat exchanger 38 having a specific structure. In the single phase type regenerative heat exchanger 38 as shown in FIGS. 4 and 5 a plate-fin type is used. FIG. 4 shows a unit module 60 in the single phase type regenerative heat exchanger 38, and FIG. 5 shows an entire single phase type regenerative heat exchanger 38 which is 10 constituted by gathering 25 pieces of the unit modules 60 as shown in FIG. 4. The exhaust gas of the gas turbine flows in from an exhaust gas inlet port 62 and is discharged from an exhaust gas outlet port 64, while the heat thereof being taken off in the regenerative heat exchanger. On the other hand, the compressed air supplied from the compressor 10 flows in from a compressed air inlet port 66 and flows out from a compressed air outlet port 68, while taking off the heat from the exhaust gas. In order to save piping works for the pipings of the compressed air for the respective unit modules it is preferable to use collective pipes 70 connecting the compressed air inlet ports and outlet ports for the respective unit modules.

When the regenerative heat exchanger is constituted in the unit module structure as shown in FIG. 5, a proper regenerative heat exchanger meeting to a gas turbine having any output can be constituted only by changing number of unit modules. Thereby, the research and developing time for the regenerative heat exchanger is shortened and the designing cost thereof can be saved.

Figure 6:
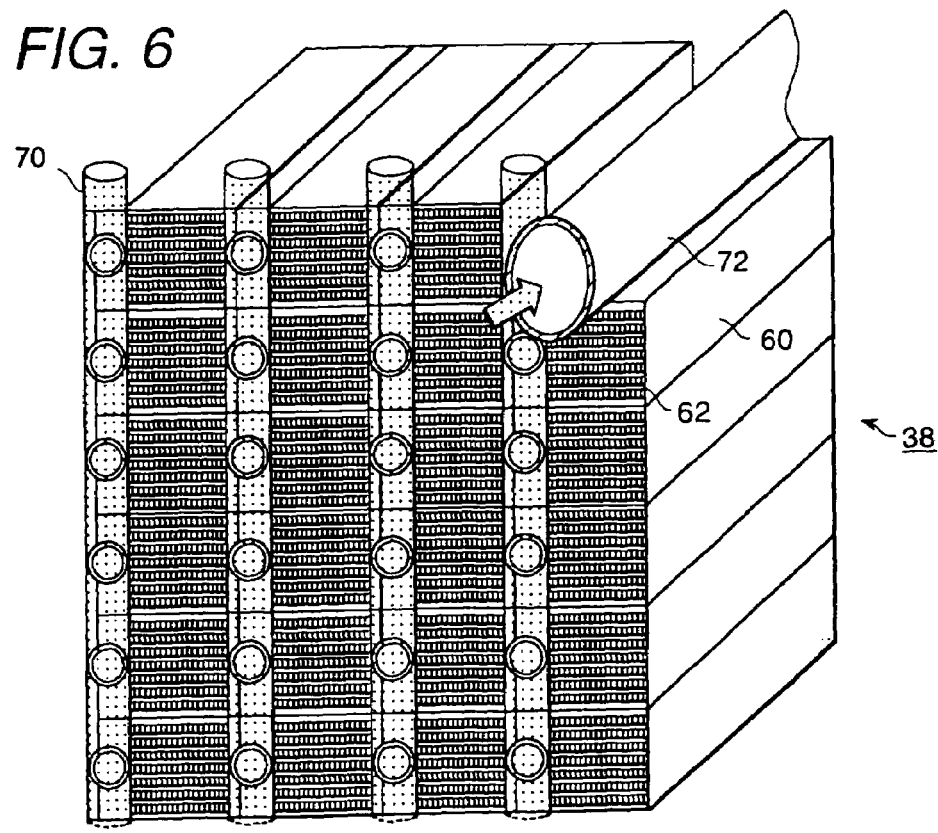
FIG. 6 is a diagram of a modification of FIG. 5 embodiment showing a regenerative heat exchanger structure and a piping layout.

FIG. 6 is a diagram showing a modification of FIG. 5 single phase type regenerative heat exchanger. A pipe in which air having a higher temperature than the atmospheric air but lower temperature than the exhaust gas is sometimes required to prevent heat radiation of the air therein and to prevent heat loss. Further, when the compressed air in the pipe contains water droplets, such pipe is sometimes required to heat the air therein and to accelerate evaporation of the water droplets. In such instances, when a part of the modules is removed and an air pipe 72 is laid in the space adjacent to the neighboring modules as shown in FIG. 6, the heat radiation form the regenerative heat exchanger prevents the heat loss of the compressed air through the pipe and sometimes heats the air therein. Through the moduling of the regenerative heat exchanger, flexibility of piping layout around the regenerative heat exchanger can be increased as well as since the radiating heat of the regenerative heat exchanger can be effectively utilized, the plant efficiency can be enhanced.

Further, in the pipe which supplies the compressed air from the compressor to the regenerative heat exchanger, if a porous material is filled, a mixing effect between the water droplets and air can be enhanced, thereby, many water droplets can be rapidly evaporated. With such measure, further much moisture content can be evaporated with a simple installation and the output and efficiency of the gas turbine can be increased with low cost.

According to the gas turbine installation of the present invention, generation of erosion and scales due to water droplets are suppressed, and a compact gas turbine installation with high efficiency and high output can be provided.

The invention claimed is:

1. A gas turbine installation comprising a compressor which compresses air, a combustor which combusts the compressed air by the compressor and fuel, a turbine which is driven by combustion gas produced in the combustor, a regenerative heat exchanger which performs heat exchange between exhaust gas exhausted from the turbine and at least a part of the compressed air supplied to the combustor and a water spraying device which sprays water into intake air to the compressor or into the compressed air compressed by the compressor, characterized in that a heat transfer surface of the regenerative heat exchanger is constructed by a plate-fin structure, and a gap of the fin of the regenerative heat exchanger is wider at an upstream side for a flow of compressed air than that at a lower stream side.

2. A gas turbine installation of claim 1, wherein at least a part of the regenerative heat exchanger is constituted by gathering a plurality of block shaped modules.

3. A gas turbine installation of claim 1, wherein a part of the regenerative heat exchanger is constituted by a pipe shaped heat exchanger and at the midway of the pipe a water discharge use drain is provided.

4. A gas turbine installation of claim 1, wherein the water spraying device includes a first water spraying device which adds water into intake air of the compressor at the upstream of the compressor, a second water spraying device which adds water to the compressed air to be supplied to the regenerative heat exchanger at or near the outlet of the compressor and a third water spraying device which adds water to the compressed air to be supplied to the regenerative heat exchanger at or near the inlet of the regenerative heat exchanger.

5. A gas turbine installation of claim 1, wherein a part of passage which introduces the compressed air to the regenerative heat exchanger is arranged so as to pass a region having temperature higher than the temperature of the compressed air flowing through the passage.

* * * * *